(12) United States Patent
Lee et al.

(10) Patent No.: US 11,182,072 B2
(45) Date of Patent: Nov. 23, 2021

(54) TOUCH SCREEN, A VEHICLE HAVING THE SAME, AND A METHOD OF CONTROLLING THE VEHICLE

(71) Applicants: HYUNDAI MOTOR COMPANY, Seoul (KR); KIA MOTORS CORPORATION, Seoul (KR)

(72) Inventors: Gukho Lee, Yeongju-si (KR); Youngsoo Ji, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/829,947

(22) Filed: Mar. 25, 2020

(65) Prior Publication Data
US 2021/0072892 A1 Mar. 11, 2021

(30) Foreign Application Priority Data

Sep. 9, 2019 (KR) .......................... 10-2019-0111190

(51) Int. Cl.
*G06F 3/0488* (2013.01)
*G06F 3/044* (2006.01)
(Continued)

(52) U.S. Cl.
CPC ..... *G06F 3/04886* (2013.01); *B60H 1/00735* (2013.01); *B60K 35/00* (2013.01);
(Continued)

(58) Field of Classification Search
CPC ............. G06F 3/04886; G06F 3/04883; G06F 3/0447; G06F 2203/04803;
(Continued)

(56) References Cited

U.S. PATENT DOCUMENTS 6,157,372 A * 12/2000 Blackburn .......... G06F 3/04883
345/157
9,460,575 B2 * 10/2016 Park ..................... B60R 25/2045
(Continued)

FOREIGN PATENT DOCUMENTS

KR 20130119770 A 11/2013

*Primary Examiner* — Ibrahim A Khan
(74) *Attorney, Agent, or Firm* — Lempia Summerfield Katz LLC

(57) ABSTRACT

A vehicle includes: a plurality of electronic devices each configured to adjust an angle of a part thereof, disposed at different positions and configured to perform the same function a touch screen having a plurality of touch areas for receiving operation commands of the plurality of electronic devices, respectively, configured to display a plurality of display areas respectively corresponding to the plurality of touch areas; and a controller configured to recognize the touch areas and touch gestures based on a touch signal received by the touch screen, to identify the electronic device corresponding to the recognized touch area, to identify operation information corresponding to the recognized touch gesture, and to control the identified electronic device based on the identified operation information. The plurality of electronic devices includes at least one of a plurality of vents, a plurality of lighting devices, and a plurality of sound output devices.

16 Claims, 20 Drawing Sheets

(51) Int. Cl.
  *B60H 1/00* (2006.01)
  *B60K 35/00* (2006.01)
(52) U.S. Cl.
  CPC ........ *G06F 3/0447* (2019.05); *G06F 3/04883* (2013.01); *B60K 2370/1438* (2019.05); *B60K 2370/1468* (2019.05); *G06F 2203/04803* (2013.01)
(58) Field of Classification Search
  CPC ................ B60H 1/00735; B60K 35/00; B60K 2370/1438; B60K 2370/1468
  See application file for complete search history.

(56) References Cited

U.S. PATENT DOCUMENTS

| | | | | |
|---|---|---|---|---|
| 10,845,987 B2* | 11/2020 | Thakur | | G06F 3/04883 |
| 2008/0211779 A1* | 9/2008 | Pryor | | G06F 3/04847 |
| | | | | 345/173 |
| 2009/0085880 A1* | 4/2009 | Vitale | | G06F 3/0489 |
| | | | | 345/173 |
| 2009/0102805 A1* | 4/2009 | Meijer | | G06F 3/016 |
| | | | | 345/173 |
| 2012/0013548 A1* | 1/2012 | Choi | | B60K 35/00 |
| | | | | 345/173 |
| 2014/0053113 A1* | 2/2014 | Zoon | | G06F 3/017 |
| | | | | 715/863 |
| 2014/0095031 A1* | 4/2014 | Boblett | | G06F 3/04883 |
| | | | | 701/49 |
| 2014/0109080 A1* | 4/2014 | Ricci | | G06F 3/04886 |
| | | | | 717/174 |
| 2015/0081291 A1* | 3/2015 | Jeon | | G06F 3/04883 |
| | | | | 704/235 |
| 2015/0175172 A1* | 6/2015 | Truong | | G10L 25/48 |
| | | | | 701/36 |
| 2015/0210287 A1* | 7/2015 | Penilla | | G06F 3/04842 |
| | | | | 701/49 |
| 2016/0266778 A1* | 9/2016 | Rawlinson | | B60K 35/00 |
| 2018/0009288 A1* | 1/2018 | Bhasin | | B60H 1/00742 |
| 2018/0059913 A1* | 3/2018 | Penilla | | B60W 40/08 |
| 2018/0103318 A1* | 4/2018 | Amman | | H04R 3/02 |
| 2019/0176837 A1* | 6/2019 | Williams | | B60W 50/02 |
| 2019/0244405 A1* | 8/2019 | Tokuchi | | G06F 40/30 |
| 2020/0031196 A1* | 1/2020 | Chevers | | B60H 1/00828 |
| 2020/0148033 A1* | 5/2020 | Skapof | | B60H 1/00985 |
| 2020/0369115 A1* | 11/2020 | Woodward | | B60H 1/00871 |

* cited by examiner

TOUCH SCREEN, A VEHICLE HAVING THE SAME, AND A METHOD OF CONTROLLING THE VEHICLE

CROSS-REFERENCE TO RELATED APPLICATION

This application is based on and claims priority under 35 U.S.C. § 119 to Korean Patent Application No. 10-2019-0111190, filed on Sep. 9, 2019 in the Korean Intellectual Property Office, the disclosure of which is incorporated by reference in its entirety.

TECHNICAL FIELD

The disclosure relates to a touch screen that receives a user input as a touch input and generates a control signal for controlling at least one device or a function based on the received touch input, and a vehicle having the same and a method of controlling the vehicle.

BACKGROUND

Vehicles may perform basic driving functions and additional functions for user convenience, such as an audio function, a video function, a navigation function, an air-conditioning control function, a seat heating function, a lighting function, a sound outputting function, and the like.

Vehicles may further include a plurality of buttons configured to receive an operation command of a function performed in various electronic devices.

For example, vehicles may include a plurality of buttons configured to receive operation commands for the air-conditioning control function of an air conditioner. The plurality of buttons may include an up and down blowing direction selection button, a left and right blowing direction selection button, and a blowing amount selection button. An opening and closing selection button for each of a plurality of vents may also be provided. In this case, in order to adjust a blowing direction and a blowing amount desired by the air conditioner, it is necessary to input the operation command for each vent using the button determined for each vent. As a result, there is an inconvenience of having to individually control the blowing control command for each vent, which also increases the number of times each button needs to be operated and the operation time of the button for each vent also increases.

In addition, the blowing control command input by the user is a one-time change. The blowing control command cannot be changed automatically but instead can only be changed manually.

SUMMARY

Therefore, it is an aspect of the disclosure to provide: a touch screen for receiving any one operation command of a plurality of vents as a touch input and for generating and outputting control information of any one vent based on the received touch input; a vehicle having the same; and a method of controlling the vehicle.

It is another aspect of the disclosure to provide: a touch screen for receiving at least two or more operation commands among the plurality of vents and generating and outputting the control information of at least two or more vents based on the received operation commands; a vehicle having the same; and a method of controlling the vehicle.

It is another aspect of the disclosure to provide: a touch screen for receiving the touch input and for generating and outputting a control command of an electronic device based on the received touch input; a vehicle having the same; and a method of controlling the vehicle.

Additional aspects of the disclosure are set forth in part in the description which follows and, in part, are to be understood from the description or may be learned by practice of the disclosure.

In accordance with an aspect of the disclosure, a touch screen includes a touch inputter having a plurality of touch areas, configured to receive operation commands of a plurality of vents, respectively; a display configured to display a plurality of display areas respectively corresponding to the plurality of touch areas; and a controller. The controller is configured to recognize the touch areas and touch gestures based on a touch signal received by the touch inputter, to identify the vent corresponding to the recognized touch area, to identify operation information corresponding to the recognized touch gesture, and to transmit identification information of the identified vent and the identified operation information.

The touch gestures may include at least one of a first gesture configured to control a blowing direction, a second gesture configured for integrated control and individual control of at least two vents, a third gesture configured to control opening and closing of the vents, and a fourth gesture configured to set a blowing path.

The controller may be configured to: when the touch gesture is the first gesture, identify position information of a touch point corresponding to the touch signal; transmit blowing control information corresponding to the identified position information of the touch point to the identified vent; identify the display area corresponding to the recognized touch area; and control a pointer to be displayed on the identified display area based on the identified position information of the touch point.

The controller may be configured to: when the touch gesture is the second gesture, identify position information of at least two touch points corresponding to the touch signal; when the identified position information of at least two touch points is one of the position information of an integrated touch area, divide the integrated touch area into individual touch areas; and divide and display an integrated display area into individual display areas based on the divided individual touch areas.

The controller may be configured to: when the touch gesture is the second gesture, identify position information of at least two touch points corresponding to the touch signal; determine whether the positions of the at least two touch points are inside at least two individual touch areas based on the identified position information of the at least two touch points; when it is determined that the positions of the at least two touch points are inside the at least two individual touch areas, integrate the at least two touch areas into an integrated touch area; and integrally display the at least two individual display areas corresponding to the at least two individual touch areas into an integrated display area.

The controller may be configured to: identify at least two vents corresponding to the at least two individual touch areas; identify position information of the touch point based on the touch signal corresponding to the first gesture; and transmit blowing control information corresponding to the identified position information of the touch point to the identified at least two vents.

The controller may be configured to control the display to display an overlap pointer at a position of the touch point.

The controller may be configured to control the display to display the integrated display area in a size corresponding to the sum of the sizes of the integrated individual display areas.

The controller may be configured to transmit opening and closing information to the identified vent when the touch gesture is the third gesture.

The controller may be configured to: determine whether a curve formed by the fourth gesture is a closed curve when the touch gesture is the fourth gesture; and, when it is determined that the curve is the closed curve, transmit blowing path information corresponding to the fourth gesture to the identified vent.

The controller may be configured to: determine whether a curve formed by the fourth gesture is an opened curve when the touch gesture is the fourth gesture; and when it is determined that the curve is the opened curve, transmit blowing path information corresponding to the opened curve to the identified vent.

In accordance with another aspect of the disclosure, a vehicle includes a plurality of electronic devices configured to adjust an angle. The plurality of electronic devices are disposed at different positions and configured to perform the same function. The vehicle further includes a touch screen having a plurality of touch areas for receiving operation commands of the plurality of electronic devices, respectively, configured to display a plurality of display areas respectively corresponding to the plurality of touch areas. The vehicle also includes a controller configured to recognize the touch areas and touch gestures based on a touch signal received by the touch screen, to identify the electronic device corresponding to the recognized touch area, to identify operation information corresponding to the recognized touch gesture, and to control the identified electronic device based on the identified operation information.

The plurality of electronic devices may include a plurality of vents provided in an air conditioner. The plurality of vents may further include at least one of a first adjuster configured to adjust an up and down blowing direction of each vent, a second adjuster configured to adjust a left and right blowing direction of each vent, and a third adjuster configured to open or close each vent.

The touch gestures may include at least one of a first gesture configured to control a blowing direction, a second gesture configured for integrated control and individual control of at least two vents, a third gesture configured to control opening and closing of the vents, and a fourth gesture configured to set a blowing path.

The controller may be configured to: when the touch gesture is the first gesture, identify position information of a touch point corresponding to the touch signal; and control the identified vent based on blowing control information corresponding to the identified position information of the touch point.

The controller may be configured to: when the touch gesture is the second gesture, identify position information of at least two touch points corresponding to the touch signal; when the identified position information of at least two touch points is one of the position information of an integrated touch area, divide the integrated touch area into individual touch areas; and control the touch screen to display an individual display area based on the divided individual touch areas.

The controller may be configured to: when the touch gesture is the second gesture, identify position information of at least two touch points corresponding to the touch signal; determine whether the positions of the at least two touch points are inside at least two individual touch areas based on the identified position information of the at least two touch points; when it is determined that the positions of the at least two touch points are inside the at least two individual touch areas, integrate the at least two touch areas into an integrated touch area; and display the at least two individual display areas corresponding to the at least two individual touch areas into an integrated display area.

The controller may be configured to: identify at least two vents corresponding to the at least two individual touch areas; identify position information of the touch point based on the touch signal; and control the identified at least two vents based on the blowing control information corresponding to the identified position information of the touch point.

The controller may be configured to: when the touch gesture is the third gesture, identify a state of the identified vent; when the identified state of the vent is in an opening state, close and control the identified vent; and when the identified state of the vent is in a closing state, open and control the identified vent.

The controller may be configured to control the blowing direction of the identified vent based on the blowing path information corresponding to the fourth gesture when the touch gesture is the fourth gesture.

In accordance with another aspect of the disclosure, in a method of controlling a vehicle, the vehicle has a plurality of vents configured to blow a heat exchanged air in an air conditioner to the vehicle interior. The method includes: displaying, by a display, a plurality of individual display areas respectively corresponding to a plurality of touch areas respectively receiving operation commands of the plurality of vents; when a touch signal is received, recognizing, by a controller, the touch areas and touch gestures based on the received touch signal; identifying, by the controller, the vent corresponding to the recognized touch area; controlling, by the controller, the identified vent based on the recognized touch gesture; when at least two touch areas of the plurality of touch areas are touched, changing, by the controller, the at least two touch areas into an integrated touch area; displaying, by the display, an integrated display area corresponding to the integrated touch area; and controlling, by the controller, at least two vents corresponding to the at least two touch areas based on position information of touch points of the integrated touch area.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
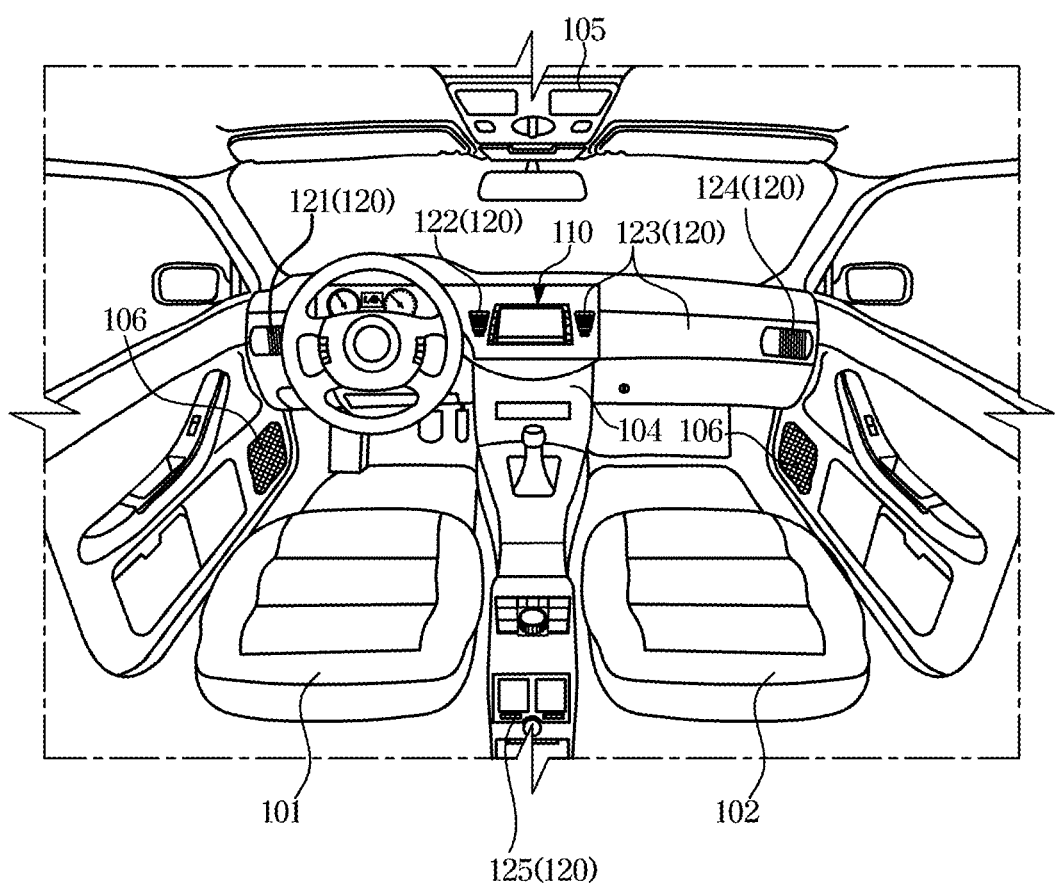
FIG. 1 is a view illustrating an interior of a vehicle according to an embodiment of the disclosure.

Like reference numerals refer to like elements throughout the specification. Not all elements of the embodiments of the disclosure are described. Description of what is commonly known in the art or what overlaps with each other in the embodiments is omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It should be understood that, when an element is referred to as being "connected" to another element, it can be directly or indirectly connected to the other element. The indirect connection includes "connection" via a wireless communication network.

Also, when a part "includes" or "comprises" an element, unless there is a particular description contrary thereto, the part may further include other elements, not excluding the other elements.

It should be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle embodiments of the disclosure are described below with reference to the accompanying drawings.

FIG. 1 is a view illustrating an interior of a vehicle according to an embodiment of the disclosure.

A vehicle 1 may include a body with exterior and interior parts, and a chassis on which mechanical devices required for driving are installed.

The exterior parts of the body may include some that are provided to be opened and closed. The exterior parts may include a front bumper, a hood, a roof panel, a rear bumper, front, rear, left and right doors, and may include fixed windows installed at the front and rear of the vehicle 1.

Referring to FIG. 1, the interior part of the body may include seats 101 and 102 for people to sit thereon, a dashboard, an instrument panel (or cluster) and a center fascia 104 placed on the dashboard. A head unit is provided in the center fascia 104 and configured to receive operation commands of audio or radio devices.

The vehicle 1 may include electronic devices installed for the convenience of a driver. The vehicle 1 may include electronic devices such as a lighting device 105 for adjusting internal brightness, a sound output device 106 for audio output, a communication device for communicating with an internal device or an external device, a vehicle terminal 110 for inputting/outputting various information, and an air conditioner 120 for adjusting the internal temperature.

In addition, the vehicle 1 may further include a hands-free device, an audio device and a Bluetooth device, a rear camera, a high pass device, and the communication device installed for the convenience of the driver.

The terminal 110 is provided in the dashboard and is provided in the dashboard between the driver's seat 101 and the passenger's seat 102. The terminal 110 may output a result corresponding to the input by a user.

The terminal 110 may be an audio-video navigation (AVN) device that integrally performs an audio function, a video function, and a navigation function.

In addition, the terminal 110 may include a display for displaying information about at least one of the audio function, the video function, and the navigation function as an image. The display may also display information input by the user.

The terminal 110 may further include an inputter for receiving a user command for at least one of the audio function, the video function, and the navigation function.

The terminal 110 may receive the user command from the inputter separately installed from the display.

The inputter of the terminal 110 may include a plurality of buttons, keys, switches. The inputter may further include a jog dial or a touch pad for inputting a movement command and a selection command of a cursor displayed on the display of the terminal 110.

The terminal 110 may be a touch screen in which the display and the inputter are integrally provided so that the user may select desired information while viewing the image. The inputter of the terminal 110 may be a graphical user interface.

The display of the terminal 110 may include a display panel, and the inputter may include a touch panel provided in front of the display panel. In this case, the touch panel is a transparent touch panel, which allows the user to visually identify the image by transmitting the image displayed on the display panel disposed at the rear. The touch panel may generate a touch signal corresponding to a touch position when the user's finger or a manipulator is touched.

The touch panel may be classified into various types according to the driving method. The touch panel may include at least one of: a resistive type in which a direct current (DC) voltage is applied to a metal electrode arranged on an upper plate or a lower plate and a touched position may be determined as a voltage gradient according to a resistance; a capacitive type in which an equal potential is formed on a conductive film and a touched portion may be determined by detecting a position where a voltage change of an upper plate and a lower plate due to a touch is detected; an electro-magnetic type in which the LC value induced by touching the conductive film may be detected by the electronic pen to sense the touched portion; a surface acoustic wave (SAW) type; and an infrared type.

The inputter of the terminal 110 may receive an on command and an off command of a navigation mode and receive information of a destination.

The inputter of the terminal 110 may receive channel information and volume information in a digital multimedia broadcasting (DMB) mode, audio information to be played in an audio mode, or a search term in a search mode.

The display of the terminal 110 may display navigation information in the navigation mode, audio information in the audio mode, broadcast information in the DMB mode, and a search window and search results in the search mode.

The vehicle 1 may further include the touch screen configured to receive operation commands of various electronic devices provided in the vehicle 1. For example, the electronic device may include at least one of the lighting device, the sound output device, and the air conditioner.

The touch screen may be a device that is separate from the vehicle terminal 110, and may be provided in the head unit or the center fascia of the vehicle 1, or may be provided in a steering wheel. Also, the touch screen may be a user terminal for communicating with the vehicle 1.

The touch screen may be the vehicle terminal 110. In one embodiment, the touch screen is implemented as a vehicle terminal 110. Accordingly, in the disclosure, '110' which is the same number as the vehicle terminal 110 is referred to as a reference number of the touch screen.

The touch screen 110 may receive a blowing of air control command for adjusting a blowing on/off, a blowing of air amount, and a blowing direction of the air supplied by the air conditioner 120. The touch screen 110 may display the adjusted blowing information.

The air conditioner 120 may include a heat exchanger, a fan, and a plurality of vents 121, 122, 123, and 124. The air conditioner 120 moves the air heat exchanged by the heat exchanger to the vent side through the fan to allow the air to be discharged through the vents 121-124. In this case, the plurality of vents 121-124 may control the operation of the vents 121-124 based on the blowing control command received by the touch screen 110.

In this example, the plurality of vents 121-124 may be provided on the dash board but may be provided at both end portions and the center of the dashboard. There may be two vents 122 and 123 in the center of the dashboard. In addition, the two vents 122 and 123 installed in the center of the vehicle 1 may be provided in the center fascia 104.

The vents may be provided on the rear seat inside the vehicle 1 but may also be provided on an arm rest.

Each vent may be provided with a first adjuster for adjusting the blowing direction up and down, a second adjuster for adjusting the blowing direction from side to side, and a third adjuster for adjusting the opening and closing of the vent. In this example, it is also possible to adjust the blowing amount by adjusting an opening degree of the third adjuster.

The touch screen 110 may receive a light emission control command for turning on/off a driver's seat side light and a passenger's seat side light provided in an overhead console, a light provided in a head lining corresponding to the left side of the rear seat, a light provided in a head lining corresponding to the right side of the rear seat, a light emission direction, a light emission amount, and display the adjusted operation information. In this case, the touch screen 110 may receive operation information about a plurality of lights at once.

The sound output device may be a speaker that outputs sound in response to a control command of a controller. In other words, the speaker may be provided at the front left and right, rear left and right inside the vehicle 1.

The chassis of the vehicle 1 is a frame for supporting the body. The chassis of the vehicle 1 may be provided with: wheels arranged on the front, rear, left, and right sides; a power device for applying a driving force to the front, rear, left, and right wheels; a steering system; a braking device for applying a braking force to the front, rear, left and right wheels; and a suspension device for adjusting a suspension of the vehicle 1.

Figure 2:
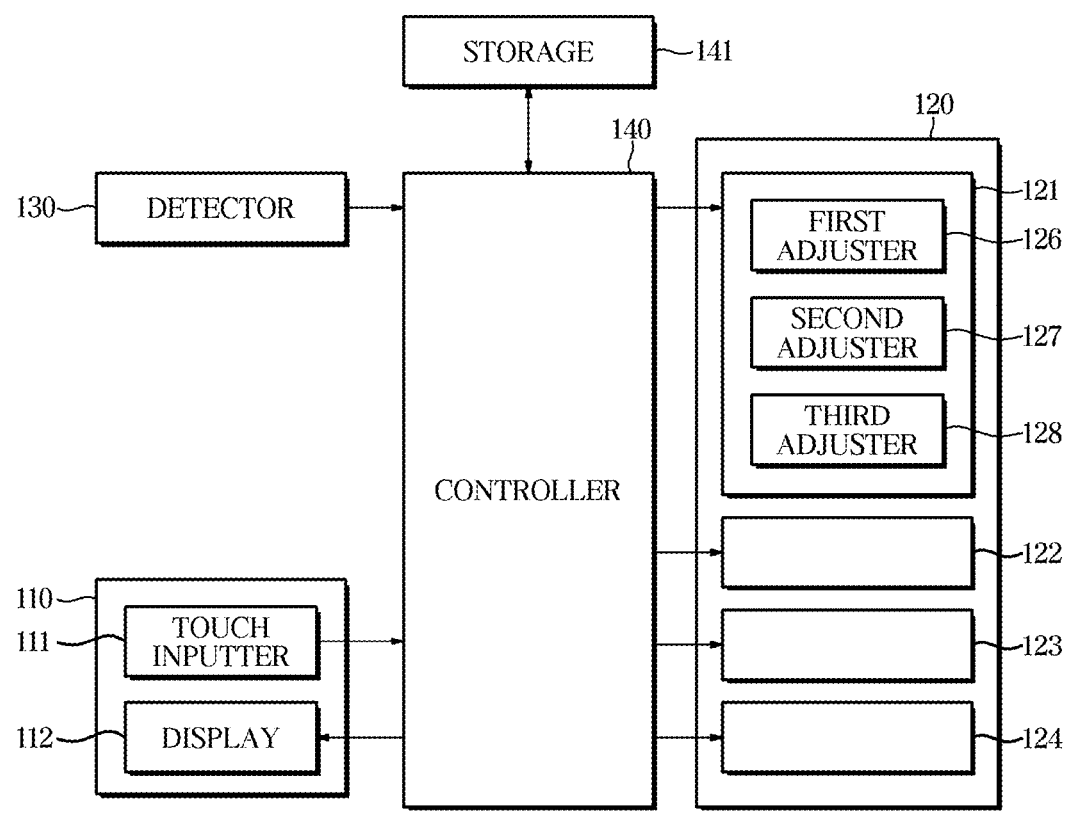
FIG. 2 is a control block diagram of a vehicle according to an embodiment of the disclosure.

FIG. 2 is a control block diagram of a vehicle according to an embodiment of the disclosure. The configuration of controlling the vent of the air conditioner 120 using the touch screen 110 is described below.

The vehicle 1 may include the touch screen 110, the air conditioner 120, a detector 130, a controller 140, and a storage 141.

The touch screen 110 may include the touch panel that is a touch inputter 111 and the display panel that is a display 112. The touch screen 110 may display operation information corresponding to a user input inputted to the touch inputter 111 through the display 112.

The touch screen 110 may transmit the touch signal input to the touch panel, which is the touch inputter 111, to the controller 140 and display operation information of the air conditioner 120 through the display 112 in response to the control command of the controller 140. The touch signal may be a signal corresponding to a touched time or a touched position.

The touch inputter 111 of the touch screen 110 may have a plurality of touch areas corresponding to a plurality of vents. The display 112 may have a plurality of display areas corresponding to the plurality of touch areas.

The touch inputter 111 of the touch screen 110 may have an integrated touch area in response to an integration command. In this case, the display 112 of the touch screen 110 may have an integrated display area corresponding to the information of the integrated touch area.

The display 112 of the touch screen 110 may display a touch area that the user can touch in response to the plurality of vents. The display 112 of the touch screen 110 may display the integrated touch area in response to the integration command.

The display 112 of the touch screen 110 may display state information of a current vent and may display the state information of the vent changed in response to the user input. The changed state information of the vent may include information corresponding to the blowing amount, the blowing direction, and whether the blowing on/off. The changed state information may further include information corresponding to position information of a point touched by the user.

The air conditioner 120 may transmit the heat exchanged air to the plurality of vents 121-124 disposed at different positions in the vehicle 1.

The plurality of vents 121-124 allow the air introduced therein to be discharged. In other words, the plurality of vents 121-124 may induce the blowing. At this time, the blowing amount and the blowing direction discharged by the first, second, and third adjusters provided in the vents may be adjusted.

Each vent may include a first adjuster 126 for adjusting the up and down angles of the discharged air during the discharge of the introduced air, a second adjuster 127 for adjusting left and right angles of the discharged air during the discharge of the introduced air, and a third adjuster 128 to allow blocking or discharging of the discharged air.

The first adjuster 126 may include a first blade or plurality thereof disposed horizontally in the vent, and a first actuator for operating the first blade. The second adjuster 127 may include a second blade or a plurality thereof disposed vertically in the vent, and a second actuator for operating the second blade. The third adjuster 128 may include an opening and closing member disposed in the vent so as to be opened and closed, and a third actuator for operating the opening and closing member. In this example, the first, second and third actuators may include a motor.

In addition, the second blade of the second adjuster 127 and the opening and closing member and the third adjuster 128 may be provided as one member. In this case, the second and third actuators may include one motor. The third adjuster 128 may adjust the blowing amount of each vent by adjusting the opening degree of each vent in response to the control command of the controller 140.

The detector 140 may be provided for each vent. The detector 140 may detect the angle of the first adjuster 126, the angle of the second adjuster 127, and an opening and closing state of the third adjuster 128 of each vent.

When controlling the plurality of vents 121-124 individually, the controller 140 may divide the touch area of the touch inputter 111 by the same number of vents and control the display 112 to display the display area of the display 112 by the same number of vents.

For example, when four vents are provided in the vehicle 1, the controller 140 may divide the areas of the touch inputter 111 into a first touch area for receiving the blowing control command of a first vent 121, a second touch area for receiving the blowing control command of a second vent 122, a third touch area for receiving the blowing control command of the a third vent 123, and a fourth touch area for receiving the blowing control command of the a fourth vent 124. The controller 140 may control the display 112 to display a first display area corresponding to the first touch area, a second display area corresponding to the second touch area, a third display area corresponding to the third touch area, and a fourth display area corresponding to the fourth touch area on the area of the display 112.

The first display area is an area for displaying operation information of the first vent 121, the second display area is an area for displaying operation information of the second vent 122, the third display area is an area for displaying operation information of the third vent 123, and the fourth display area is an area for displaying operation information of the fourth vent 124.

Figure 3:
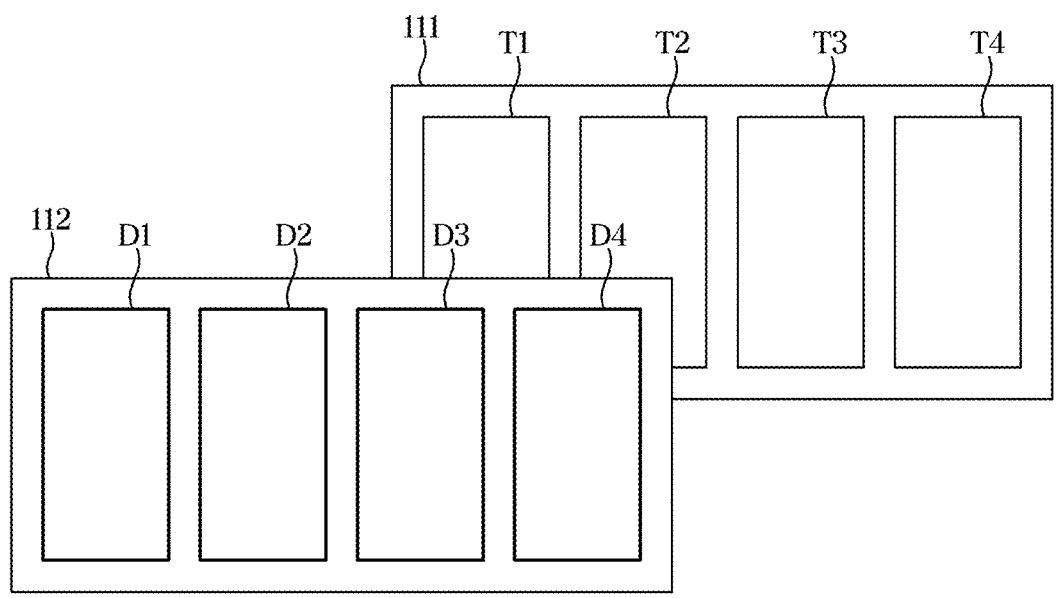
FIG. 3 is a view illustrating touch areas and display areas of a touch screen when individually controlling a plurality of vents provided in a vehicle according to an embodiment of the disclosure.

Referring to FIG. 3, in response to the control command of the controller 140, the touch inputter 111 of the touch screen 110 may include a first touch area T1, a second touch area T2, a third touch area T3, and a fourth touch area T4. The display 112 may include a first display area D1, a second display area D2, a third display area D3, and a fourth display area D4. The display 112 may display each display area in a box shape so that the user can easily input the blowing control command by touching a display area.

When the controller 140 collectively controls at least two vents of the plurality of vents 21-24, the controller 140 may integrate at least two touch areas corresponding to the at least two vents selected by the user. The controller 140 may control the display 112 to display the display area corresponding to the integrated touch area.

For example, when four vents 121-124 are provided in the vehicle 1 and the first and second vents 121 and 122 are integrally controlled, the controller 140 may divide the areas of the touch inputter 111 into the integrated touch area for receiving the blowing control command of the first vent 121 and the second vent 122, the third touch area for receiving the blowing control command of the third vent 123, and the fourth touch area for receiving the blowing control command of the fourth vent 124. The controller 140 may control the display 112 to display the integrated display area corresponding to the integrated touch area, the third display area corresponding to the third touch area, and the fourth display area corresponding to the fourth touch area on the area of the display 112.

Figure 4:
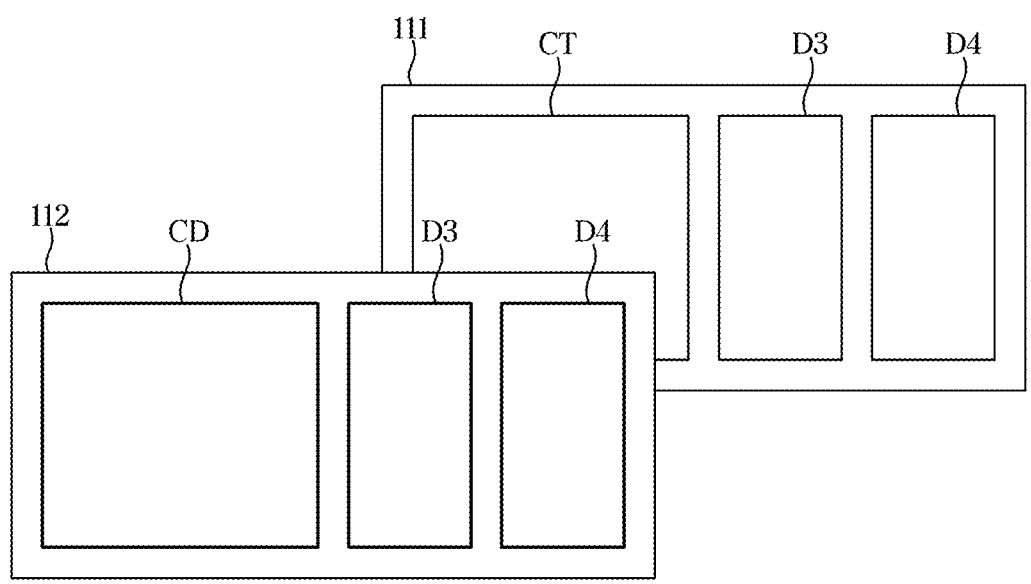
FIG. 4 is a view illustrating touch areas and display areas of a touch screen when integrated control of at least two vents among a plurality of vents is provided in a vehicle according to an embodiment of the disclosure.

Referring to FIG. 4, in response to the control command of the controller 140, the touch inputter 111 of the touch screen 110 may include an integrated touch area CT, the third touch area T3, and the fourth touch area T4. The display 112 may include an integrated display area CD, the third display area D3, and the fourth display area D4, and may display each display area in the box shape so that the user can easily touch input the blowing control command.

In addition, a size of a pointer displayed in the integrated display area may be larger than the size of the pointer of the display area displayed individually. A shape of the pointer displayed in the integrated display area may be a shape in which two pointers overlap.

The controller 140 may obtain the state information of each vent based on detection information transmitted from the detector 130 and control the display 112 of the touch screen 110 to display the obtained state information of each vent. The controller 140 may display the blowing direction of each vent.

Figure 5:
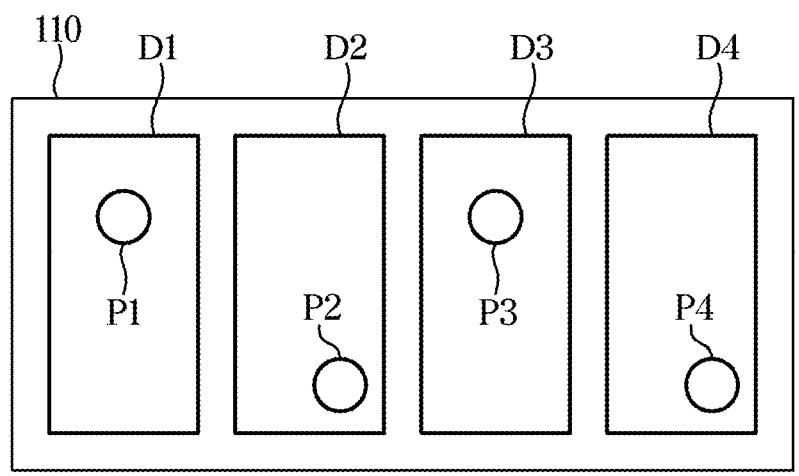
FIG. 5 is a view illustrating a pointer of a touch screen provided in a vehicle according to an embodiment of the disclosure.

Referring to FIG. 5, in response to the control command of the controller 140, the touch screen 110 may display the blowing directions of the vents in the display areas D1-D4 displaying the touch areas corresponding to the vents with pointers P1-P4, respectively.

The controller 140 may display the blowing amount of each vent and may display the opening and closing state of the vent.

The controller 140 may identify last control information of the actuators of the first, second and third adjusters 126, 127, and 128 of each vent and may obtain a current state information based on the identified last control information. For example, the controller 140 may identify information about a rotation angle of a first motor of the first adjuster 126 of the first vent 121. The controller 140 may further obtain information about the up and down angles of the first adjuster 126 of the first vent 121 based on the identified information about the rotation angle of the first motor.

When the touch signal is received from the touch inputter 111, the controller 140 may: identify position information of a touch point based on the received touch signal; recognize touch gesture information corresponding to the change of the position based on time information and the identified position information; identify the touch area where the touch point touched by the user is located based on the position information of the touch point and the position information of the plurality of touch areas stored in the storage 141; identify identification information of the vent corresponding to the identified touch area; control the operation of at least one of the first, second, and third adjusters 126, 127, and 128 provided in the vent having the identification information identified based on the recognized touch gesture information; and control the display 112 to display the changed blowing direction with the pointer in response to the operation control in the display area corresponding to the identified touch area. This allows the controller 140 to adjust the blowing direction according to user needs.

The controller 140 allows only one pointer to be displayed in one display area, move the pointer displayed in each display area only within each display area, and display only within each display area.

The touch gesture may include a first gesture corresponding to a blowing direction change command, a second gesture corresponding to an integrated control command, a third gesture corresponding to an opening/closing command of the vent, and a fourth gesture corresponding to a blowing path setting command. The touch gesture information may include information about the first gesture, information about the second gesture, information about the third gesture, and information about the fourth gesture.

The first, second, third, and fourth gestures are described below with reference to FIGS. 6A, 6B, 7, 8A, 8B, 8C, 8D, 9A, and 9B.

Figure 6A:
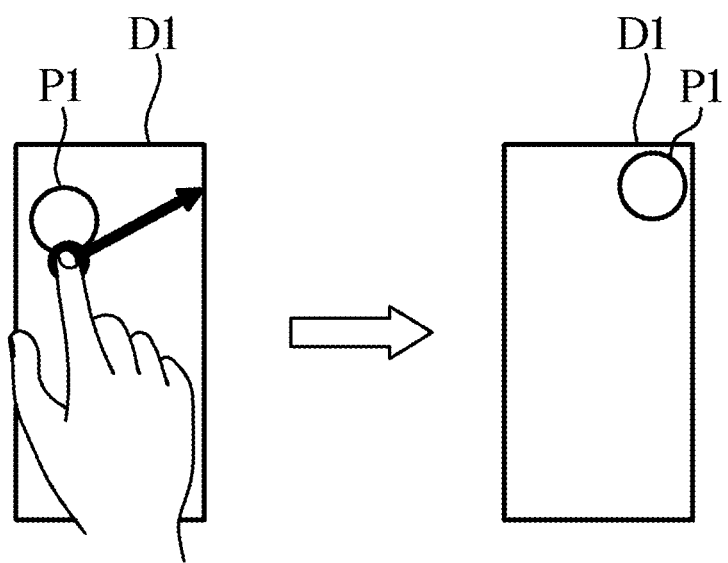
FIGS. 6A and 6B are views illustrating a touch input of a first gesture among touch inputs of a touch screen provided in a vehicle according to an embodiment of the disclosure.

Referring to FIG. 6A, the first gesture corresponding to the blowing direction change command may include a single touch.

Figure 6B:
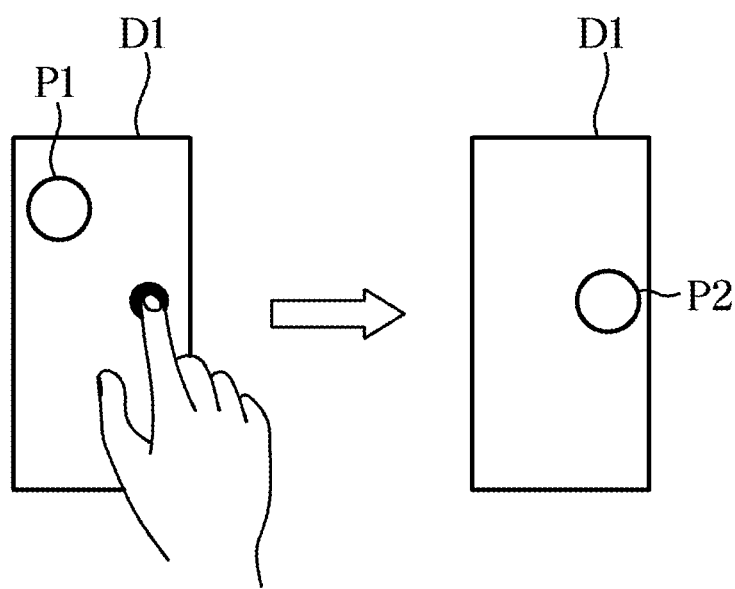

Referring to FIG. 6B, the first gesture corresponding to the blowing direction change command may include at least one drag. The drag may be a drag by the single touch, and a line followed by the drag may be a curve including a curvature of less than a predetermined curvature, in other words, a gesture close to a straight line.

The second gesture corresponding to the integrated control command may include at least one of a multi-touch and a double tap. The integrated control command may include an integrated control execution command and an integrated control release command. The double tap in this example may refer to touching a same point or similar point twice.

Figure 7:
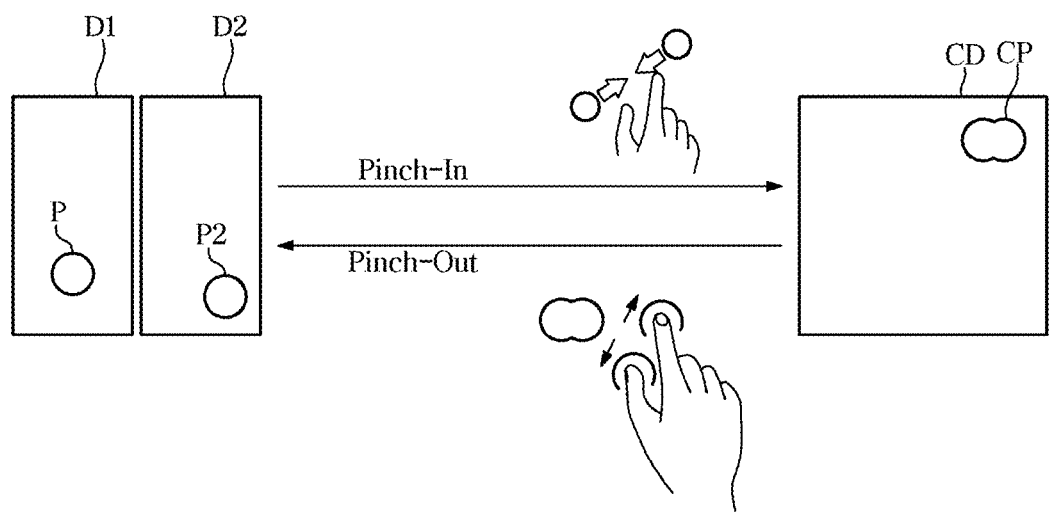
FIG. 7 is a view illustrating a touch input of a second gesture among touch inputs of a touch screen provided in a vehicle according to an embodiment of the disclosure.

Referring to FIG. 7, the gesture corresponding to the integrated control execution command may include a pinch in gesture in at least two display areas. The gesture corresponding to the integrated control release command may include a pinch out gesture in the integrated display area.

The pinch in gesture may be a gesture in which a distance between multi-touch points due to the multi-touch comes closer. The pinch out gesture may be a gesture in which the multi-touch points are separated by the multi-touch.

The pinch in gesture and the pinch out gesture may be made on the pointer in the integrated display area or at any position within the integrated display area.

The size of the pointer displayed in the integrated display area may be larger than the size of the pointer in the display area displayed individually. The shape of the pointer CP displayed in the integrated display area may be the shape in which part of two pointers are overlapped.

Figure 8A:
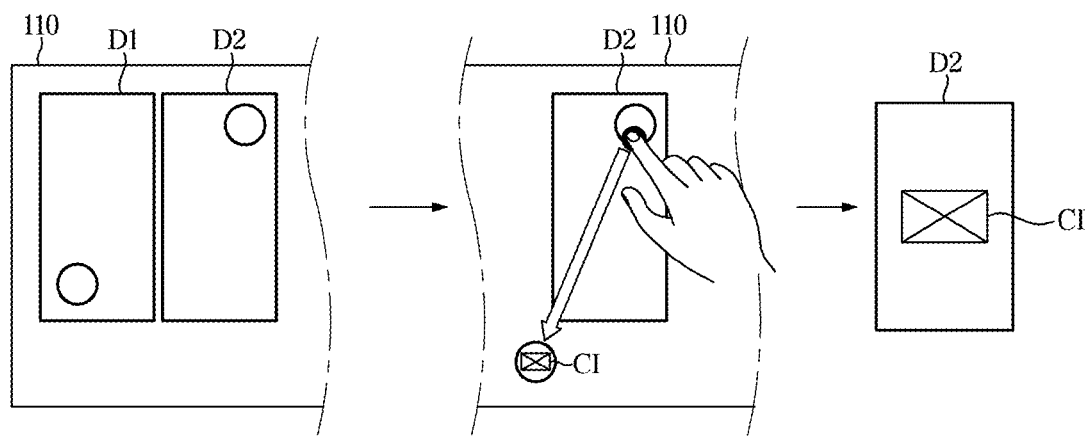
FIGS. 8A-8D are views illustrating a touch input of a third gesture among touch inputs of a touch screen provided in a vehicle according to embodiments of the disclosure.

Referring to FIG. 8A, the third gesture corresponding to the opening/closing command of the vent may include dragging to a closed icon CI displayed outside the display area and may include a long touch at one position for a predetermined time or more.

Figure 8B:
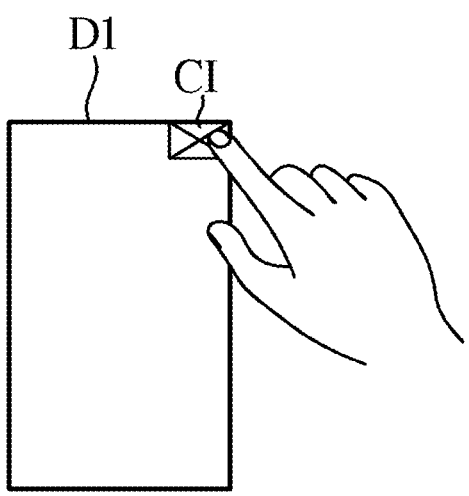

Referring to FIG. 8B, the third gesture corresponding to the opening/closing command of the vent may include a touch of the closed icon CI displayed in the display area and may further include dragging of the closed icon CI displayed in the display area.

Figure 8C:
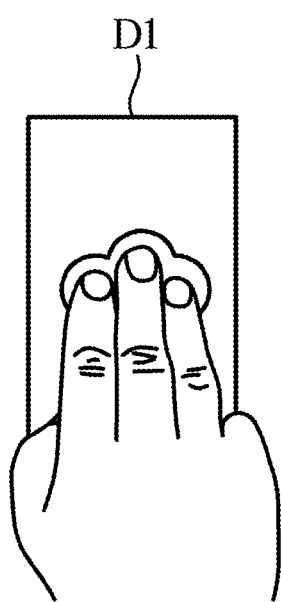

Referring to FIG. 8C, the third gesture corresponding to the opening/closing command of the vent may include at least three multi-touches.

Figure 8D:
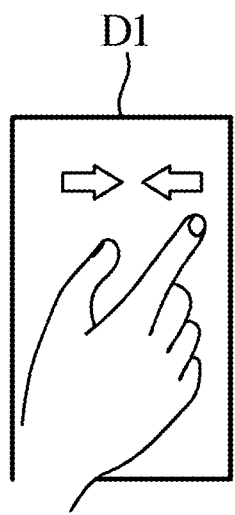

Referring to FIG. 8D, the third gesture corresponding to the opening/closing command of the vent may include a pinch in/out gesture in one display area.

The fourth gesture corresponding to a setting of a blowing path may include a curved gesture by the single touch.

In this example, the curved gesture by the single touch may include a gesture including a curve having curvature of a predetermined curvature or more, a gesture including at least two curved portions, and a gesture having an angle less than a predetermined angle.

Figure 9A:
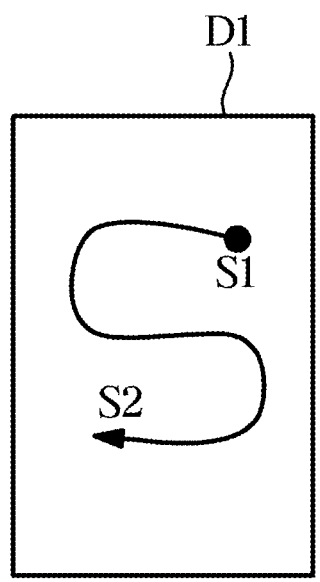
FIGS. 9A and 9B are views illustrating a touch input of a fourth gesture among touch inputs of a touch screen provided in a vehicle according to embodiments of the disclosure.
Figure 9B:
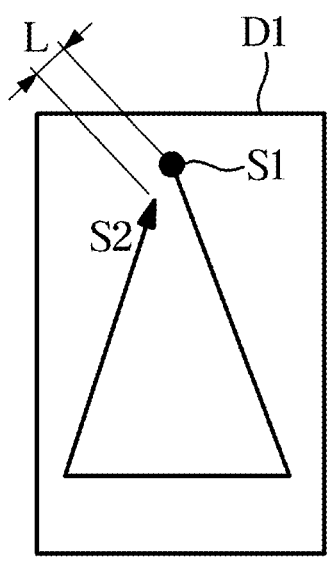

Referring to FIGS. 9A and 9B, the curved gesture may include at least one of an opened curve gesture by the single touch and drag, and a closed curve gesture by the single touch and drag. The opened curve gesture may be a gesture in which the distance between the start point and the end point is greater than or equal to a reference distance. The closed curve gesture may be a gesture in which a distance L between the start point S1 and an end point S2 is less than the reference distance. In this example, the reference distance may be different according to the operation command of the vent.

In addition, the fourth gesture corresponding to the blowing path setting may further include the opened curve gesture by multi-touch and drag and the closed curve gesture by the multi-touch and drag.

The multi-touch may be a touch including at least two touch points.

More particularly, when the touch signal is received from the touch inputter 111, the controller 140 may obtain information about the number of touch points, position information of the touch points, and time information of the touch points based on the received touch signals. The controller 140 may recognize the touch area and the touch gesture information touched by the user based on the information about the number of touch points, the position information of the touch points, and the time information of the touch points. The controller 140 may control at least one of the first, second, and third adjuster 126, 127, and 128 of the vent corresponding to the touch area. However, the controller 140 may control at least one of the first, second, and third adjuster 126, 127, and 128 based on the touch gesture information.

For example, when it is determined that the touch gesture information recognized in the individual control state is information about the first gesture, the controller 140 may control the operation of at least one of the first and second adjusters 126 and 127 of the vent corresponding to the individual touch area. When it is determined that the touch gesture information recognized in the individual control state is information about the second gesture, the controller 140 may change to the integrated control state. When it is determined that the touch gesture information recognized in the integrated control state is information about the second gesture, the controller 140 may change to the individual control state. When it is determined that the touch gesture information recognized in the integrated control state is information about the first gesture, the controller 140 may control at least one operation of first and second adjusters 126 and 127 of at least two vents corresponding to the integrated touch area.

When the controller 140 controls the operation of at least one of the first and second adjusters 126 and 127, the controller 140 may obtain a change amount in a first axis and a change amount in a second axis by comparing the position of the current pointer with the changed pointer position. The controller 140 may identify angle information corresponding to the amount of change from the angle information corresponding to the amount of change stored in the storage 141 to the first axis. The controller 140 may identify the angle information corresponding to the obtained amount of change to the second axis, and control the operation of the second adjuster 127 based on the angle information corresponding to the identified amount of change to the first axis, and control the operation of the first adjuster 126 based on the angle information corresponding to the amount of change to the second axis.

In this example, the first axis and the second axis are perpendicular to each other, and when the first axis is the X axis, the second axis may be the Y axis.

When the controller 140 controls the operation of at least one of the first and second adjusters 126 and 127, the controller 140 may: obtain the angle information of the first adjuster 126 and the angle information of the second adjuster 127 corresponding to the changed position information of the pointer from the position information and the angle information of the pointer stored in the storage 141; control the operation of the first adjuster 126 based on the obtained angle information of the first adjuster 126; and control the operation of the second adjuster 127 based on the obtained angle information of the second adjuster 127.

When it is determined that the touch gesture information recognized in the individual control state is information about the third gesture, the controller 140 may control the operation of the third adjuster 128 of the vent corresponding to the individual touch area. More particularly, when it is determined that the touch gesture information recognized in the individual control state is information about the third gesture, the controller 140 may determine whether the vent state corresponding to the individual touch area is the opening state or the closing state. When it is determined that the vent state is the opening state, the controller 140 may control the closing of the vent. When it is determined that the vent state is in the closing state, the controller 140 may control the opening of the vent.

For example, when it is determined that the position of the touch point is the position of the closed icon based on the position information of the touch point and the position information of the closed icon, the controller 140 may control the operation of the third adjuster 128 to close the vent.

In another example, when the touch signal is received, the controller 140 may identify the position information of the touch point based on the received touch signal and count a time at which the touch signal is received when the identified position information of the touch point is the same. The controller 140 may determine the third gesture when the counted time is greater than or equal to the reference time. The controller 140 may control the operation of the third adjuster 128 so that the vent is opened or closed.

In another example, the controller 140 may identify the number of touch points based on the received touch signal. The controller 140 may control the operation of the third adjuster 128 so that the vent is opened or closed when the number of identified touch points is a predetermined number (e.g., three).

When the controller 140 determines that the touch gesture information recognized in the individual control state is information about the fourth gesture, the controller 140 may identify at least two touch areas in which at least two touch points are located, integrate the identified at least two touch areas, integrate at least two display areas corresponding to the identified at least two touch areas, control the display 112 to display the integrated display area, and control the display 112 to display an overlap point in which at least two pointers are overlapped in the integrated display area.

When displaying the integrated display area, the controller 140 may control the display 112 to display the sizes of the integrated individual display areas in a size corresponding to the sum of the sizes. For example, when the controller 140 controls the two vents integrally, the integrated display area may have a size obtained by adding up the sizes of two separate display areas.

When the controller 140 controls the at least two vents, the controller 140 may adjust the blowing direction of the at least two vents based on the position information of one touch point touched by the integrated touch area.

When adjusting the blowing direction of the at least two vents, the controller 140 may adjust the blowing direction of the at least two vents based on position information of the edge of the integrated display area and movement limit information of the vent for integrated control. For example, the controller 140 may set the movement limit positions of at least two vents to the position of the edge of the integrated display area. The controller 140 may control the operation of the at least two vents so that the blowing direction is adjusted to the set movement limit position.

When adjusting the blowing direction of at least two vents, the controller 140 may adjust the blowing direction of the at least two vents to a position corresponding to the position information about a three-dimensional (3D) space.

In this example, the adjusting of the blowing direction of the at least two vents controls the at least two vents such that the air is discharged to a point where a plurality of straight lines are collected when the paths of air in each vent are connected in a straight line based on the blowing direction of each vent to be integrally controlled.

In this example, the position on the 3D space is the position of any one of the positions inside the vehicle 1 and is the position of the point where the air blown from the plurality of vents integrated control is collected.

When the controller 140 determines that the touch gesture information recognized in the individual control state is information about the fourth gesture, the controller 140 may control the operation of the first and second adjusters 126 and 127 of the vent corresponding to the individual touch area, but control the operation of the first and second adjusters 126 and 127 so that the blowing direction is changed along the path corresponds to the fourth gesture.

When the controller 140 determines that the touch gesture information recognized in the integrated control state is information about the fourth gesture, the controller 140 may control the display 112 to display the plurality of touch areas and the plurality of display areas by dividing the integrated touch area and the integrated display area based on the integrated information of the integrated touch area and the integrated display area. The controller 140 may control the display 112 to display an area and a plurality of display areas. The controller 140 may control the display 112 to display the pointer in each of the plurality of display areas, respectively. In this example, the integrated information includes identification information and position information of the touch area that has been integrated, and identification information and position information of the display area that has been integrated.

When it is determined that the touch gesture information recognized in the integrated control state is information about the fourth gesture, the controller 140 may control the operations of the first and second adjusters 126 and 127 of the at least two vents corresponding to the integrated touch area. However, the controller 140 may control the operations of the first and second adjusters 126 and 127 so that the blowing direction is changed along the path corresponding to the fourth gesture. In this case, the blowing direction of at least two vents may be a point inside the vehicle 1. For example, when a point in the vehicle 1 is a head rest of the driver's seat 101, at least two vents may blow toward the head rest of the driver's seat 101.

Figure 10A:
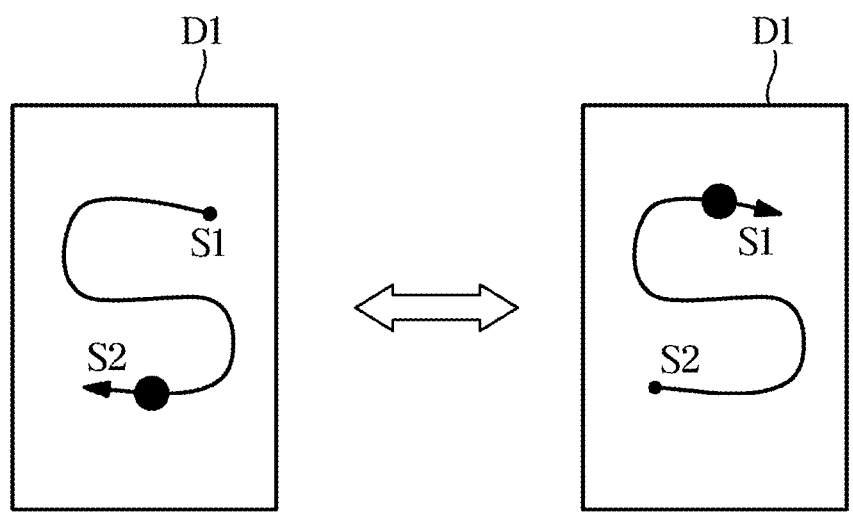
FIGS. 10A-10C are views illustrating examples of setting a blowing path and changing a blowing direction of a vent provided in a vehicle according to embodiments of the disclosure.

Referring to FIG. 10A, the controller 140 may control the operations of the first and second adjusters 126 and 127 so that the blowing direction changes along the path from the start point to the end point when the opened curve gesture is recognized. When the operation control of the first and second adjusters 126 and 127 is complete at the end point, the controller 140 may control the operations of the first and second adjusters 126 and 127 to change the blowing direction along a reverse path from the end to the start point.

When the touch signal is received after the blowing path setting command is received, the controller 140 may identify a vector value of an instantaneous speed for each touch point according to the change of time, store the identified vector value, and display the blowing path when the input of the opened curve gesture is completed. The controller 140 may control the display 112 to display the path by a thickness corresponding to the vector value of the instantaneous speed at each point.

In addition, the controller 140 may identify the vector value of the instantaneous speed for each touch point, identify a color corresponding to the identified vector value, and control the display 112 to display the blowing path based on the identified color.

Figure 10B:
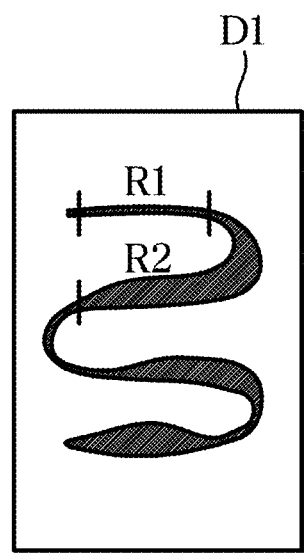

Referring to FIG. 10B, the controller 140 may identify an instantaneous speed vector value for each touch point on the opened curve, identify line thickness information corresponding to the identified vector value of the instantaneous speed, and control the display 112 to display the lines of the path in different thickness based on the identified line thickness information. The controller 140 may control the speed quickly as the line thickness of the path displayed on the display 112 becomes thinner. The controller 140 may control the speed slowly as the line thickness of the path displayed on the display 112 becomes thicker.

For example, when the line thickness of the path displayed on the display 112 is a first thickness, the controller 140 may pass a first path R1 having the line of the first thickness at a first speed. When the line thickness of the path displayed on the display 112 is a second thickness, the controller 140 may pass a second path R2 having the line of the second thickness at a second speed. In this example, the first thickness is thinner than the second thickness, and the first speed is faster than the second speed.

Figure 10C:
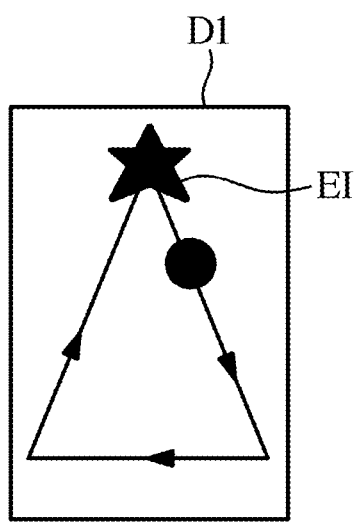

Referring to FIG. 10C, when the controller 140 recognizes the closed curve gesture, the controller 140 may control the display 112 to display an icon EI indicating the end of a closed curve recognition. The controller 140 may control the operations of the first and second adjusters 126 and 127 to change the blowing direction along the path of the closed curve.

The controller 140 may be implemented by one processor.

The controller 140 may be provided in the touch screen or elsewhere in the vehicle 1 or may communicate with the touch screen provided in the vehicle 1.

The controller 140 may be implemented with the memory storing an algorithm to control operation of the components in the vehicle 1 or data about a program that implements the algorithm, and the processor carrying out the aforementioned operation using the data stored in the memory. The memory and the processor may be implemented in separate chips. Alternatively, the memory and the processor may be implemented in a single chip.

The storage 141 may store identification information of the plurality of vents, identification information and position information of the touch area corresponding to each vent, and identification information and position information of the display area corresponding to each touch area.

For example, the storage 141 may store the identification information and position information of the first touch area T1, the second touch area T2, the third touch area T3, and the fourth touch area T4 of the touch inputter 111. The identification information and position information of the first display area D1, the second display area D2, the third display area D3, and the fourth display area D4 of the display 112 may be stored.

The storage 141 may store; the identification information of at least two vents for performing the integrated control; the position information and the identification information of the integrated touch area; and/or the identification information and the position information of each individual touch area corresponding to each individual vent.

For example, the storage 141 may store the identification information of the integrated touch area, the identification information of the integrated display area, and the position information of the integrated touch area for the integrated control of the first and second vents 121 and 122, the position information of the touch area corresponding to the third vent 123, and the position information of the touch area corresponding to the fourth vent 124.

In addition, the storage 141 may store the identification information of the integrated touch area, the identification information of the integrated display area, the position information of the integrated touch area, and the position information of the integrated display area for the integrated control of the first, second, third, and fourth vents 121, 122, 123, and 124.

The storage 141 may store the angle information of the first adjuster 126 and the angle information of the second adjuster 127 corresponding to the position change amount of the pointer in each display area.

The storage 141 may store the angle information of the first adjuster 126 and the angle information of the second adjuster 127 corresponding to the position information of the pointer in each display area.

The storage 141 may store a plurality of touch gesture information for controlling the operation of each vent. For example, the storage 11 may store information about the first gesture, the second gesture, the third gesture, and the fourth gesture.

The storage 141 may be a memory implemented with a chip separate from the aforementioned processor in relation to the controller 140 or may be implemented integrally with the processor in a single chip.

The storage 141 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

Figure 11A:
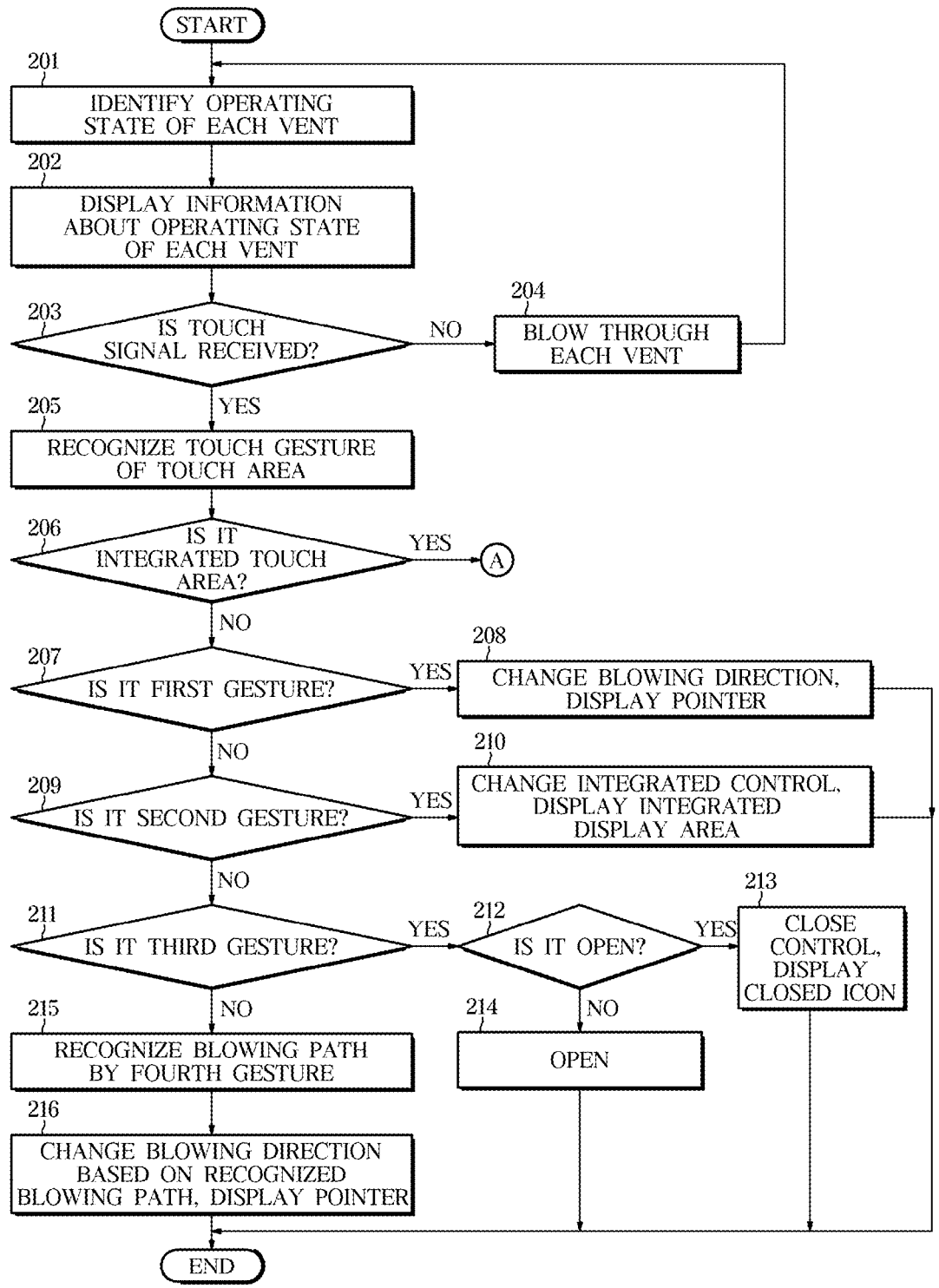
FIGS. 11A and 11B are a control flowchart of a vehicle according to embodiments of the disclosure.
Figure 11B:
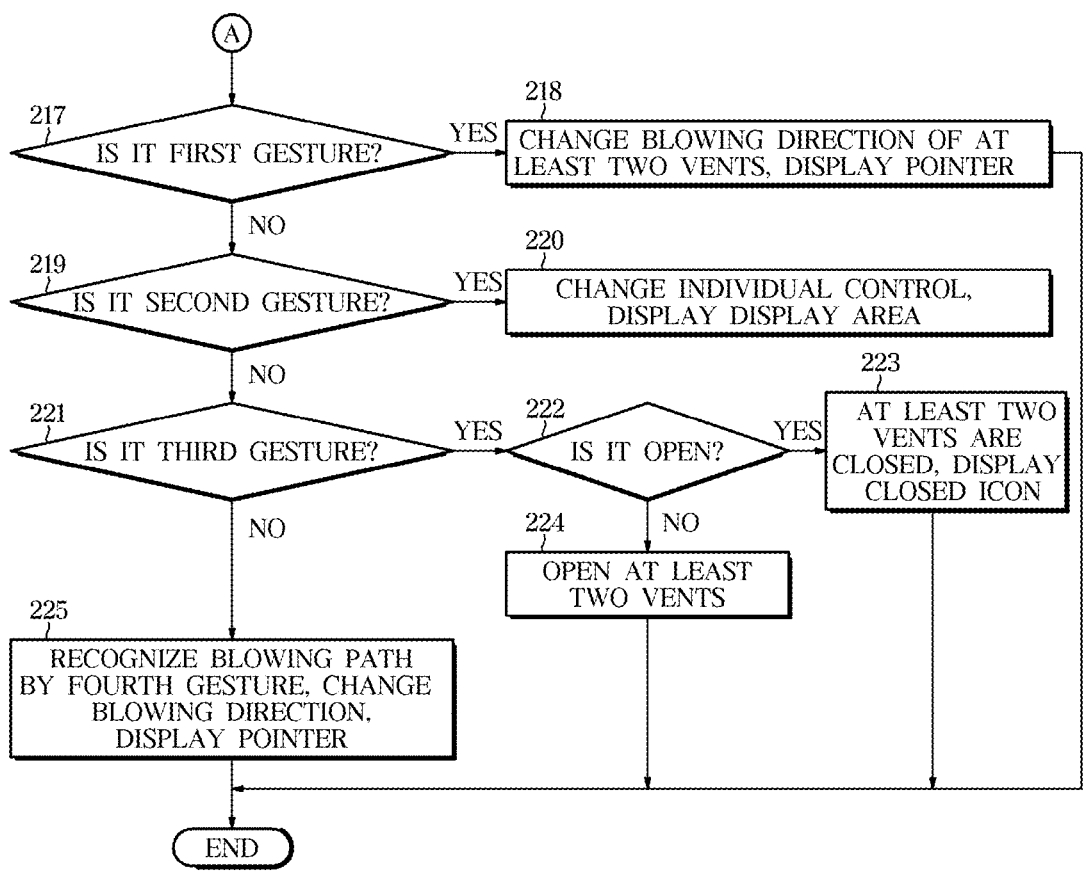

FIGS. 11A and 11B is a control flowchart of a vehicle according to an embodiment of the disclosure.

When the vehicle 1 receives a command to turn on the air conditioner 120, the vehicle 1 may identify a current operating state of the plurality of vents 121-124 provided in the vehicle 1, respectively (201). The vehicle 1 may display information about the identified current operating state of each of the vents on each display area of the touch screen (202).

The identifying the current operating state of the plurality of vents 121-124, respectively may include identifying the detection information detected by the detector 130 provided in each vent and identifying the operating state of the first, second and third adjusters 126, 127, and 128 corresponding to the detected detection information.

The identifying the current operating state of each of the plurality of vents 121-124 may include identifying the last state information of the vents 121-124 before turning on the air conditioner 120 from the information stored in the storage 141, in other words, prior to the operation of the air conditioner 120.

The identifying the current operating state of each of the plurality of vents 121-124 may include identifying an angle of the first blade of the first adjuster 126 of each vent, the angle of a second blade of the second adjuster 127, and the opening and closing state of a damper of the third adjuster 128. In other words, the identified information about the current operating state includes angle information of the first blade and angle information of the second blade of each vent and includes opening and closing information of each vent.

The identified information about each current operating state may include the blowing direction information of each vent corresponding to the angle information of the first blade and the angle information of the second blade of each vent.

The displaying information about the current operating state of each vent on each display area of the touch screen may include: identifying whether it is the individual control state for individual controlling the plurality of vents 121-124, dividing areas of the touch inputter 111 of the touch screen into the number of touch areas corresponding to the number of vents 121-124 when it is the individual control state, and dividing and displaying the display areas respectively corresponding to the divided touch areas.

The displaying information about the current operating state of each vent on each display area of the touch screen may include: identifying whether it is the integrated control state for integrated controlling of at least two vents of the plurality of vents 121-124; when it is the integrated control state for integrated controlling of the at least two vents, integrating the at least two touch areas corresponding to the at least two vents; maintaining the touch area corresponding to the remaining vents; and displaying the integrated display area corresponding to the integrated touch area and the display area corresponding to the maintained touch area.

The displaying information about the current operating state of each vent on each display area of the touch screen may include displaying a closed icon in the display area corresponding to the at least one vent when the state of the at least one vent is closed. When the vent state is in an open state, identifying the blowing direction of the vent in the opening state when the state of the at least one vent is in the opening state, and displaying the identifying blowing direction with the pointer on the display area corresponding to the vent in the opening state.

The vehicle 1 may determine whether the touch signal for changing the operating state of at least one vent is received (203). When it is determined that the touch signal is not received, the vehicle 1 may allow the heat exchanged air to discharge through each vent while maintaining the current operating state of each vent. In other words, the vehicle 1 may blow through the plurality of vents 121-124 (204).

When the vehicle 1 determines that the touch signal is received, the vehicle 1 may identify the information of the number of touch points and the position information of the touch points based on the received touch signals and may identify whether the position of the touch points changes with the time. When it is determined that the position of the touch point is changed, the vehicle 1 may identify position change information of the touch point, recognize the touch area touched by the user based on the position information of each touch area stored in the storage 141, and recognize the touch gesture based on the information of the number of touch points, the position information of the touch points, the time information of the touch point, and the position change information of the touch points (205).

Since the display area is determined for each vent and only the touch points touched in each display area are recognized, when the drag or curve due to the touch is recognized, the vehicle 1 may identify the touch area based on the position information of any point on the drag or curve (e.g., start point, middle or end point).

The vehicle 1 may identify at least one vent corresponding to the recognized touch area and control the operation of the at least one vent based on the recognized touch gesture, but control at least one of the first, second and third adjusters 126, 127, and 128 of the at least one vent.

A configuration for controlling the operation of the at least one vent is described in more detail below.

The vehicle 1 may determine whether the recognized touch area is the integrated touch area (206). When it is determined that the recognized touch area is not the integrated touch area, in other words, when the vehicle 1 determines that the recognized touch area is the individual touch area, the vehicle 1 may identify the identification information of the vent that corresponds to the individual touch area and determine whether the recognized touch gesture is the first gesture (207). When it is determined that the recognized touch gesture is the first gesture, the vehicle 1 may change the blowing direction of the vent with the identified identification information and display the changed blowing direction with the pointer (208).

In this example, the display of the blowing direction with the pointer may include displaying the pointer at the position of the touch point touched by the user.

For example, when the individual touch area is the third touch area for controlling the operation of the third vent, the vehicle 1 may identify the third vent having the identification information corresponding to the third touch area and change the blowing direction of the third vent to the blowing direction corresponding to the position of the touch point touched by the user.

For example, the changing the blowing direction of the third vent to the blowing direction corresponding to the position of the touch point may include: obtaining the amount of change in the first axis and the amount of change in the second axis by comparing the position of the current pointer displayed on the third display area with the position of the touch point touched by the user; identifying the angle information corresponding to the amount of change in the first axis obtained from the angle information corresponding to the amount of change stored in the storage 141; identifying the angle information corresponding to the amount of change in the obtained second axis; controlling the operation of the second adjuster 127 of the third vent based on the angle information corresponding to the identified amount of change to the first axis; and changing the blowing direction of the third vent by controlling the operation of the first adjuster 126 of the third vent based on the angle information corresponding to the amount of change to the second axis. In this example, the first axis and the second axis are perpendicular to each other. When the first axis is the X axis, the second axis may be the Y axis.

In another example, the changing the blowing direction of the third vent 123 to the blowing direction corresponding to the position of the touch point may change the blowing direction of the vent by: obtaining the angle information of the first adjuster 126 of the third vent 123 and the angle information of the second adjuster 127 of the third vent 123 corresponding to the position information of the touch point touched by the user from the position information and the angle information of the pointer stored in the storage 141; controlling the operation of the first adjuster 126 of the third vent 123 based on the obtained angle information of the first adjuster 126 of the third vent 123; and controlling the operation of the second adjuster 127 of the third vent 123 based on the obtained angle information of the second adjuster 127 of the third vent 123.

When it is determined that the recognized touch gesture is not the first gesture, the vehicle 1 may determine whether the recognized touch gesture is the second gesture (209). When it is determined that the recognized touch gesture is the second gesture, the vehicle 1 may recognize two touch areas touched by the user based on the position information of two touch points touched by the second gesture, identify two vents having the identification information corresponding to the recognized two touch areas, and change the control of the identified two vents to the integrated control.

In this example, the determining whether the second gesture may include determining whether the multi-touch is a touch input.

The vehicle 1 may change the recognized two touch areas into the integrated touch area and may display two display areas corresponding to the two touch areas as the integrated display area (210).

The vehicle 1 may change the blowing direction of the identified two vents based on the position information of the two touch points and display the changed blowing direction as an overlap pointer.

In this case, the blowing direction of the air discharged from the two vents may be directed to the same point inside the vehicle 1.

For example, when integrated controlling of the first and second vents 121 and 122 is undertaken, the changing of the blowing direction of the first and second vents 121 and 122 to the blowing direction corresponding to the position of the touch point may change the blowing direction of the first and second vents 121 and 122. The changing of the blowing direction is done by: obtaining the angle information of the first adjuster 126 of the first and second vents 121 and 122 and the angle information of the second adjuster 127 of the first and second vents 121 and 122 from the position information and the angle information of the pointer stored in the storage 141; controlling the operation of the first adjuster 126 of the first and second vents 121 and 122 based on the obtained angle information of the first adjuster 126 of the first and second vents 121 and 122; and controlling the operation of the second adjuster 127 and the first adjuster 126 of the first and second vents 121 and 122 based on the obtained angle information of the second adjuster 127 and the first adjuster 126 of the first and second vents 121 and 122.

In addition, when the touch gesture by three multi-touches is recognized, the vehicle 1 may recognize the touch area in which three touch points are located and display the recognized three touch areas as the integrated display area. In this case, the vehicle 1 may control the operation of the three vents corresponding to the three touch areas.

When the touch gesture by four multi-touches is recognized, the vehicle 1 may recognize the touch area in which the four touch points are located and display the recognized four touch areas as the integrated display area. In this case, the vehicle 1 may control the operation of the three vents corresponding to the four touch areas.

When it is determined that the recognized touch gesture is not the second gesture, the vehicle 1 may determine whether it is the third gesture (211). When it is determined that the recognized touch gesture is the third gesture, the vehicle 1 may identify the vent corresponding to the touch area and determine whether the identified vent is in the opening state (212). When it is determined that the identified vent state is in the opening state, the vehicle 1 may operate the third adjuster 128 of the identified vent so that the identified vent is closed and may display the closed icon in the display area corresponding to the identified vent (213).

When the vehicle 1 determines that the identified vent state is in the closing state, the vehicle 1 may operate the third adjuster 128 of the identified vent so that the identified vent is opened (214). When the vehicle 1 opens the identified vent, the vehicle 1 may delete the closed icon displayed on the display area corresponding to the identified vent.

When the vehicle 1 determines that the recognized touch gesture is not the third gesture, the vehicle 1 may: determine that the recognized touch gesture is the fourth gesture; obtain the blowing path by the fourth gesture; change the blowing path of the vent corresponding to the position information of the touch point based on the obtained blowing path; and display the changed blowing direction with the pointer (216).

The vehicle 1 may display the blowing path when displaying the pointer.

When the blowing path is the opened curve, the vehicle 1 may control the operation of the first and second adjusters 126 and 127 of the identified vent to change the blowing direction along the path from the start point to the end point of the fourth gesture. When the operation control of the first and second adjusters 126 and 127 of the identified vent at the end point is completed, the vehicle 1 may control the operation of the first and second adjusters 126 and 127 of the identified vent so that the blowing direction changes along the reverse path from the end point to the start point.

When the vehicle 1 controls the blowing direction of the vent along the blowing path, the vehicle 1 may identify the vector value of the instantaneous speed for each touch point and adjust the time passing through the blowing path based on the identified vector value of the instantaneous speed.

The vehicle 1 may control the operation of the first and second adjusters 126 and 127 of the vent so that the blowing direction of the vent changes along the path of the closed curve when the blowing path is the closed curve.

When the vehicle 1 determines whether the touch area is the integrated touch area (206), the vehicle 1 may identify the identification information of at least two vents corresponding to the integrated touch area and may determine whether the recognized touch gesture is the first gesture (217). When it is determined that the recognized touch gesture is the first gesture, the vehicle 1 may change the blowing direction of at least two vents having the identified identification information and display the changed blowing direction as the overlap pointer (218).

In this example, the displaying the blowing direction as the overlap pointer may include displaying the pointer at the position of the touch point touched by the user.

For example, when the integrated touch area is the integrated touch area for controlling the operation of the first and second vents 121 and 122, the vehicle 1 may identify the first and second vents 121 and 122 having the identification information corresponding to the integrated touch area, and may change the blowing direction of the first and second vents 121 and 122 to the blowing direction corresponding to the position of the touch point touched by the user.

When it is determined that the recognized touch gesture is not the first gesture, the vehicle 1 may determine whether the recognized touch gesture is the second gesture (219). When it is determined that the recognized touch gesture is the second gesture, the vehicle 1 may divide the integrated touch area into two touch areas, identify two vents having the identification information corresponding to the divided two touch areas, and change the control for the two vents identified in the integrated touch area into individual controls. In addition, the vehicle 1 may display the integrated display area in two display areas (220) and display pointers corresponding to the blowing directions of the two vents in each display area.

In this example, the determining whether the second gesture is the gesture may include determining whether the multi-touch is a touch input or determining whether the overlap pointer is a touch-in a double tap.

When it is determined that the recognized touch gesture is not the second gesture, the vehicle 1 may determine whether it is the third gesture (221). When it is determined that the recognized touch gesture is the third gesture, the vehicle 1 may identify at least two vents corresponding to the integrated touch area and determine whether the identified at least two vents are in the opening state (222). When it is determined that states of the identified at least two vents are in the opening state, the vehicle 1 may operate the third adjuster 128 of the identified at least two vents so that the identified at least two vents are closed and may display the closed icon in the identified display area (223).

When the vehicle 1 determines that the states of the identified at least two vents are in the closing state, the vehicle 1 may operate the third adjuster 128 of the identified at least two vents so that the identified at least two vents are opened (224). When the vehicle 1 opens the identified at least two vents, the vehicle 1 may delete the closed icon displayed on the display area corresponding to the identified at least two vents.

When the vehicle 1 determines that the recognized touch gesture is not the third gesture, the vehicle 1 may: determine that the recognized touch gesture is the fourth gesture; obtain the blowing path by the fourth gesture; change the blowing path of the vent corresponding to the position information of the touch point based on the obtained blowing path; and display the changed blowing direction with the pointer (225).

The vehicle 1 may display the blowing path in the integrated display area when displaying the overlap pointer.

When the blowing path is the opened curve, the vehicle 1 may control the operation of the first and second adjusters 126 and 127 of the identified at least two vents to change the blowing direction along the path from the start point to the end point of the fourth gesture. When the operation control of the first and second adjusters 126 and 127 of the identified at least two vents at the end point is completed, the vehicle 1 may control the operation of the first and second adjusters 126 and 127 of the identified at least two vents so that the blowing direction changes along the reverse path from the end point to the start point.

When the vehicle 1 controls the blowing direction of the at least two vents along the blowing path, the vehicle 1 may identify the vector value of the instantaneous speed for each touch point and adjust the time passing through the blowing path based on the identified vector value of the instantaneous speed.

The vehicle 1 may control the operation of the first and second adjusters 126 and 127 of the at least two vents so that the blowing direction of the at least two vents changes along the path of the closed curve when the blowing path is the closed curve.

When the air conditioner 120 is turned off, the vehicle 1 may change each vent to a predetermined initial position and store the last state information in the storage 141.

Figure 12:
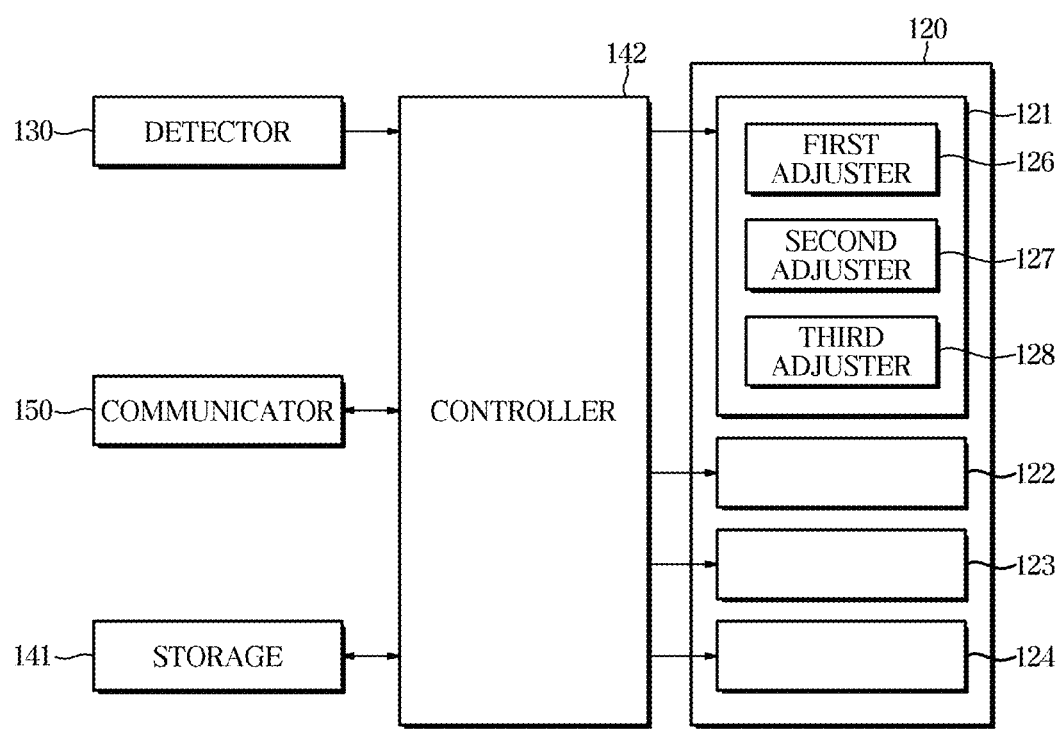
FIG. 12 is a control block diagram of a vehicle according to another embodiment of the disclosure.

FIG. 12 is a control block diagram of a vehicle according to another embodiment of the disclosure.

The vehicle 1 according to another embodiment may include the air conditioner 120, the detector 130, a controller 142, the storage 141, and a communicator 150.

The vehicle 1 according to another embodiment may receive the operation information of each vent through the communicator 150 with the vehicle 1 according an embodiment and may control the operation of each vent based on the received operation information of each vent.

The communicator 150 may communicate with the user terminal, and the user terminal may be implemented as the touch screen.

The communicator 150 may communicate with at least one of another vehicle and the user terminal.

The communicator 150 may transmit the operation information of each vent transmitted from the user terminal to the controller 142. At this time, the controller 142 may control the operation of each vent based on the received operation information of each vent. The detailed configuration of the controller 142 is the same as the controller 140 of the embodiments above, and thus description thereof is omitted.

The communicator 150 may include one or more components that enable communication with various external devices such as a server and an infrastructure, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module.

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, and the like.

As is apparent from the above description, the embodiments of the disclosure can reduce the number of physical control systems provided in a vehicle interior by replacing the physical control systems (e.g., buttons, switches, etc.) for the operation of the plurality of vents in the vehicle with a touch screen, thereby reducing the cost and simplifying a design of a center fascia in the vehicle. In other words, the disclosure can help to realize a slim cockpit image.

According to the disclosure, the driver can operate the vent out of the reach of the driver sitting in the driver's seat. In addition, the passenger sitting in the passenger's seat can operate the vent that is out of reach.

According to the disclosure, the driver or the passenger sitting in the front seat can operate the vent provided in the rear seat. This can be a consideration for vehicles with drivers or persons hired or assigned to transport passengers in the rear seat, such as taxis and limousines.

The disclosure can input not only individual vents but also blowing commands of two or more vents in one operation. In other words, the disclosure can reduce the time and process for operating the plurality of vents.

In addition, the disclosure can be used to individually or integrally operate each function of the plurality of lighting devices or the plurality of sound output devices provided in the vehicle by using the touch screen to improve the user's convenience.

The plurality of lighting devices or the plurality of sound output devices may be angle adjustable devices or devices provided with members capable of adjusting angles.

The disclosure can improve the user's satisfaction and allow the vehicle interior air to be efficiently circulated because the blowing direction of the air conditioner can be moved along the user's desired path. The disclosure can be prevented from being blown to a part of the body of the passenger can reduce the discomfort such as dryness, hotness, coldness that the passenger suffers.

As described above, the disclosure can improve the quality and the merchandise of the vehicle, improve the user's convenience, the reliability and the safety of the vehicle, and ensure the competitiveness of the product.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all kinds of recording media storing commands that can be interpreted by a computer. For example, the non-transitory computer-readable recording medium may include, for example, a ROM, a RAM, a magnetic tape, a magnetic disc, flash memory, an optical data storage device, and the like.

Embodiments of the disclosure have thus far been described with reference to the accompanying drawings. It should be understood by a person of ordinary skill in the art that the disclosure may be practiced in other forms than the embodiments as described above without changing the technical idea or essential features of the disclosure. The above embodiments are only by way of examples and should not be interpreted in a limited sense.

What is claimed is:

1. A touch screen comprising:
    a touch inputter having a plurality of touch areas, configured to receive operation commands of a plurality of vents, respectively, wherein each vent includes a first adjuster configured to adjust up and down angles of discharged air and a second adjuster configured to adjust left and right angles of the discharged air;
    a display configured to display a plurality of display areas respectively corresponding to the plurality of touch areas; and
    a controller configured to:
        recognize the touch areas and touch gestures based on a touch signal received by the touch inputter;
        identify a vent of the plurality of vents corresponding to the recognized touch area;
        when the recognized touch gesture is a first gesture to control a blowing direction, obtain a change amount in a first axis and a change amount in a second axis by comparing position information of a first touch point and position information of a second touch point corresponding to the first gesture;
        transmit identification information of the identified vent and angle information of the second adjuster corresponding to the obtained change amount in the first axis and angle information of the first adjuster corresponding to the obtained change amount in the second axis;
        when the touch gesture is a second gesture for integrated control and individual control of at least two vents of the plurality of vents, identify position information of at least two touch points corresponding to the touch signal;
        control the display to display as an integrated display area by integrating at least two individual display areas corresponding to at least two individual touch areas based on the identified position information of the at least two touch points;
        identify position information of the touch point based on the touch signal in the integrated display area corresponding to the first gesture; and
        transmit blowing control information corresponding to the identified position information of the touch point to the at least two vents of the plurality of vents corresponding to the at least two individual touch areas,
    wherein the blowing control information includes angle information of the first adjuster and the second adjuster for collecting air discharged from the at least two vents of the plurality of vents at one point in an indoor space, and
    wherein the first axis is an X axis and the second axis is a Y axis.

2. The touch screen according to claim 1, wherein the touch gestures comprises at least one of a third gesture configured to control opening and closing of the plurality of vents or a fourth gesture configured to set a blowing path.

3. The touch screen according to claim 2, wherein the controller is configured to:
    identify the display area corresponding to the recognized touch area; and
    control a pointer to be displayed on the identified display area based on the identified position information of the touch point.

4. The touch screen according to claim 2, wherein the controller is configured to:
when the identified position information of the at least two touch points is one of the position information of an integrated touch area, divide the integrated touch area into individual touch areas; and
divide and display an integrated display area into individual display areas based on the divided individual touch areas.

5. The touch screen according to claim 1, wherein the controller is configured to control the display to display an overlap pointer at a position of the touch point.

6. The touch screen according to claim 1, wherein the controller is configured to control the display to display the integrated display area in a size corresponding to the sum of the sizes of the integrated individual display areas.

7. The touch screen according to claim 2, wherein the controller is configured to transmit opening and closing information to the identified vent when the touch gesture is the third gesture.

8. The touch screen according to claim 2, wherein the controller is configured to:
determine whether a curve formed by the fourth gesture is a closed curve when the touch gesture is the fourth gesture; and
when it is determined that the curve is the closed curve, transmit blowing path information corresponding to the fourth gesture to the identified vent.

9. The touch screen according to claim 2, wherein the controller is configured to:
determine whether a curve formed by the fourth gesture is an opened curve when the touch gesture is the fourth gesture; and
when it is determined that the curve is the opened curve, transmit blowing path information corresponding to the opened curve to the identified vent.

10. A vehicle comprising:
a plurality of electronic devices disposed at different positions and configured to perform the same function, wherein each electronic device includes a first adjuster configured to adjust up and down angles of discharged air and a second adjuster configured to adjust left and right angles of the discharged air;
a touch screen having a plurality of touch areas for receiving operation commands of the plurality of electronic devices, respectively, configured to display a plurality of display areas respectively corresponding to the plurality of touch areas; and
a controller configured to:
recognize the touch areas and touch gestures based on a touch signal received by the touch screen;
identify the electronic device corresponding to the recognized touch area;
when the recognized touch gesture is a first gesture to control a blowing direction, obtain a change amount in a first axis and a change amount in a second axis by comparing position information of a first touch point and position information of a second touch point corresponding to the first gesture;
control the identified electronic device based on angle information of the second adjuster corresponding to the obtained change amount in the first axis and angle information of the first adjuster corresponding to the obtained change amount in the second axis;
when the touch gesture is a second gesture for integrated control and individual control of at least two vents of the plurality of vents, identify position information of at least two touch points corresponding to the touch signal;
control the display to display as an integrated display area by integrating at least two individual display areas corresponding to at least two individual touch areas based on the identified position information of the at least two touch points;
identify position information of the touch point based on the touch signal in the integrated display area corresponding to the first gesture; and
transmit blowing control information corresponding to the identified position information of the touch point to the at least two vents of the plurality of vents corresponding to the at least two individual touch areas,
wherein the blowing control information includes angle information of the first adjuster and the second adjuster for collecting air discharged from the at least two vents of the plurality of vents at one point in an indoor space, and
wherein the first axis is an X axis and the second axis is a Y axis.

11. The vehicle according to claim 10, wherein the plurality of electronic devices comprises a plurality of vents provided in an air conditioner, and
wherein the plurality of vents further comprises a third adjuster configured to open or close each vent.

12. The vehicle according to claim 11, wherein the touch gestures comprise at least one of a third gesture configured to control opening and closing of the plurality of vents or a fourth gesture configured to set a blowing path.

13. The vehicle according to claim 12, wherein the controller is configured to:
when the identified position information of the at least two touch points is one of the position information of an integrated touch area, divide the integrated touch area into individual touch areas; and
control the touch screen to display an individual display area based on the divided individual touch areas.

14. The vehicle according to claim 12, wherein the controller is configured to:
when the touch gesture is the third gesture, identify a state of the identified vent;
when the identified state of the vent is in an opening state, close and control the identified vent; and
when the identified state of the vent is in a closing state, open and control the identified vent.

15. The vehicle according to claim 12, wherein the controller is configured to control the blowing direction of the identified vent based on blowing path information corresponding to the fourth gesture when the touch gesture is the fourth gesture.

16. A method of controlling a vehicle, the vehicle having a plurality of vents configured to blow a heat exchanged air in an air conditioner to the vehicle interior and each vent including a first adjuster configured to adjust up and down angles of the heat exchanged air and a second adjuster configured to adjust left and right angles of the heat exchanged air, the method comprising:
displaying, by a display, a plurality of individual display areas respectively corresponding to a plurality of touch areas respectively receiving operation commands of the plurality of vents,
when a touch signal is received, recognizing, by a controller, the touch areas and touch gestures based on the received touch signal;

identifying, by the controller, a vent of the plurality of vents corresponding to the recognized touch area;

controlling, by the controller, the identified vent based on the recognized touch gesture;

when at least two touch areas of the plurality of touch areas are touched, changing, by the controller, the at least two touch areas into an integrated touch area;

displaying, by the display, an integrated display area corresponding to the integrated touch area; and controlling, by the controller, at least two vents of the plurality of vents corresponding to the at least two touch areas based on position information of touch points of the integrated touch area, wherein the controlling at least two vents corresponding to the at least two touch areas based on position information of touch points of the integrated touch area includes obtaining a change amount in a first axis and a change amount in a second axis by comparing position information of a first touch point and position information of a second touch point among the position information of touch points, and controlling the at least two vents based on angle information of the second adjuster corresponding to the obtained change amount in the first axis and angle information of the first adjuster corresponding to the obtained change amount in the second axis, and wherein the first axis is an X axis and the second axis is a Y axis, and wherein the controlling of the at least two vents includes controlling an angle of the first adjuster and an angle the second adjuster for collecting air discharged from the at least two vents at one point in the vehicle.

* * * * *